(12) United States Patent
Dittel

(10) Patent No.: US 11,661,774 B2
(45) Date of Patent: May 30, 2023

(54) ASSEMBLY FIXTURE HAVING A PIVOT PIN

(71) Applicant: GM GLOBAL TECHNOLOGY OPERATIONS LLC, Detroit, MI (US)

(72) Inventor: Matthew K. Dittel, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 470 days.

(21) Appl. No.: 16/881,273

(22) Filed: May 22, 2020

(65) Prior Publication Data

US 2021/0363800 A1     Nov. 25, 2021

(51) Int. Cl.
| | |
|---|---|
| *B62D 65/02* | (2006.01) |
| *E05C 17/36* | (2006.01) |
| *E05C 17/32* | (2006.01) |
| *B62D 25/12* | (2006.01) |
| *E05C 21/00* | (2006.01) |

(52) U.S. Cl.
CPC .............. *E05C 17/36* (2013.01); *B62D 25/12* (2013.01); *B62D 65/026* (2013.01); *E05C 17/32* (2013.01); *E05C 21/005* (2013.01)

(58) Field of Classification Search
CPC ........ E05C 17/36; E05C 17/32; E05C 21/005; B62D 25/12; B62D 65/026
See application file for complete search history.

(56) References Cited

U.S. PATENT DOCUMENTS

2012/0145849 A1\* 6/2012 Yeum ...................... B25B 11/02
248/220.21

\* cited by examiner

*Primary Examiner* — Nirvana Deonauth
(74) *Attorney, Agent, or Firm* — Lorenz & Kopf LLP

(57) ABSTRACT

An apparatus is provided for an assembly fixture for positioning a component having a pivot pin including a rigid member, a fixed positioning pin affixed to a first point on the rigid member for insertion in a first locating hole in an assembly, a component restraint affixed to a second point on the rigid member for applying a force to the component for retaining the component in a fixed position and orientation with respect to the assembly fixture, and a pivot positioning pin coupled to a third point on the rigid member by a flexible mounting assembly, the flexible mounting assembly facilitating a linear movement of the pivot positioning pin along a linear path.

13 Claims, 4 Drawing Sheets

ASSEMBLY FIXTURE HAVING A PIVOT PIN

INTRODUCTION

The technical field generally relates to automotive assembly fixtures, and more particularly relates to a method and apparatus for providing an assembly fixture including a floating pin configured to float freely in a linear direction by employing a pair of pivots for coupling the pin to the assembly fixture.

The manufacturing and assembly of complex products, such as automobiles, requires many components to be assembled in a predefined order. In the example of automobiles, each component must be secured to the vehicle chassis with fasteners affixed, such as bolts tensioned to a predetermined torque, such that the component is securely fastened for years of operation of the vehicle. A problem arises in that each component is fastened with some level of spatial variance arising from manufacturing tolerances, clearances to allow that fasteners can be inserted into holes, etc. As the vehicle is assembled, these spatial variances are cumulative such that at some point, parts may not line up with the intended location on the vehicle.

To address this problem, fixtures are often used to align parts as they are fastened to the vehicle. These fixtures typically hold the part within the fixture while pins or alignment points on the fixture are located with respect to reference points on parts of the vehicle assembly. For example, the fixture may include a first location pin that may be inserted into a locator hole in the radiator crossmember while a second pin is inserted into a locator hole in the vehicle firewall. When these two pins are inserted into their respective locator holes, the part being held by the fixture would then be sufficiently aligned to the vehicle chassis to allow for permanent securing. However, in some instances, the alignment holes for the fixture may be sufficiently misaligned or have insufficient tolerance such that the fixture may not be easily inserted or removed from the alignment holes without causing damage to the vehicle.

Accordingly, it is desirable to overcome this problem to facilitate the use of alignment fixtures during the assembly processor to accurate locate parts to be affixed to the vehicle chassis while avoiding the aforementioned problems. Furthermore, other desirable features and characteristics of the present invention will become apparent from the subsequent detailed description and the appended claims, taken in conjunction with the accompanying drawings and the foregoing technical field and background.

SUMMARY

Disclosed herein are assembly fixture and assembly fixture systems for aligning a component with an assembly in an assembly environment. By way of example, and not limitation, there is presented an automobile assembly fixture having a pivot pin for aligning a vehicle component to a vehicle assembly during assembly of an automobile in an automotive assembly facility.

In accordance with an aspect of the present invention an apparatus is provided for an assembly fixture having a pivot pin. In one embodiment, the apparatus may be an assembly fixture for positioning a component including a rigid member, a fixed positioning pin affixed to a first point on the rigid member for insertion in a first locating hole in an assembly, a component restraint affixed to a second point on the rigid member for applying a force to the component for retaining the component in a fixed position and orientation with respect to the assembly fixture, and a pivot positioning pin coupled to a third point on the rigid member by a flexible mounting assembly, the flexible mounting assembly facilitating a linear movement of the pivot positioning pin along a linear path.

In accordance with another aspect of the present invention the pivot positioning pin is coupled to the rigid member by a Watts linkage.

In accordance with another aspect of the present invention the pivot positioning pin is coupled to the rigid member by a parallel linkage.

In accordance with another aspect of the present invention the rigid member includes a triangular framework wherein the fixed positioning pin is affixed to a first vertex of the triangular framework, the component restraint is affixed to a second vertex of the triangular framework and the pivot positioning pin is coupled to a third vertex of the triangular framework.

In accordance with another aspect of the present invention the flexible mounting assembly includes a frame, a pin holder, a first parallel link coupled between the frame and the pin holder, and a second parallel link coupled between the frame and the pin holder.

In accordance with another aspect of the present invention the assembly is a vehicle and the component is a vehicle part.

In accordance with another aspect of the present invention the assembly is a vehicle and the component is an automotive body component.

In accordance with another aspect of the present invention a first handle is affixed to the rigid member and a second handle is affixed to the rigid member such that the assembly fixture may be manually positioned on to the assembly.

In accordance with another aspect of the present invention the component restraint includes a clamp configured to apply a clamping pressure on the component to secure the component to the assembly fixture.

In accordance with another aspect of the present invention the component restraint includes a magnet for applying a magnetic force to the component to secure the component to the assembly fixture.

In accordance with another aspect of the present invention the flexibly mounting assembly is configured to constrain the linear motion between a first point along a linear axis and a second point along the linear axis.

In accordance with another aspect of the present invention an apparatus is provided for an assembly fixture having a pivot pin. In an embodiment, the apparatus may be an assembly fixture for aligning a component to an assembly including a rigid framework, a fixed positioning pin mounted to the rigid framework, a component restraint for retaining a component in a fixed position and orientation, and a flexible positioning pin having a linear range of motion mounted to the rigid framework.

In accordance with another aspect of the present invention the flexible positioning pin is coupled to the rigid framework by a parallel linkage wherein the parallel linkage enables the linear motion.

In accordance with another aspect of the present invention the rigid framework is a triangular framework wherein the fixed positioning pin is affixed to a first vertex of the triangular framework, the component restraint is affixed to a second vertex of the triangular framework and the flexible positioning pin is coupled to a third vertex of the triangular framework.

In accordance with another aspect of the present invention the flexible positioning pin is coupled to the rigid framework by a flexible mounting assembly including a frame, a pin holder, a first parallel link coupled between the frame and the pin holder, and a second parallel link coupled between the frame and the pin holder.

In accordance with another aspect of the present invention the assembly is a vehicle and the component is a vehicle component.

In accordance with another aspect of the present invention a first handle is affixed to the rigid framework and a second handle is affixed to the rigid framework such that the assembly fixture may be manually positioned on to the assembly.

In accordance with another aspect of the present invention an apparatus is provided for an assembly fixture having a pivot pin. In an embodiment, the apparatus may be a component positioning device for positioning an automotive component on an automotive assembly including a triangular rigid framework, a component clamp for applying a clamping pressure on the automotive component such that the automotive component is retained in a fixed position and orientated with respect to the triangular rigid framework, a rigid positioning pin immovably affixed to a second vertex of the triangular rigid framework, and a moveable positioning pin coupled to a third vertex of the triangular rigid framework by a parallel linkage to enable a linear range of motion of the moveable positing pin.

In accordance with another aspect of the present invention the component clamp includes a magnet for applying a magnetic force to the component to secure the component to the assembly fixture.

In accordance with another aspect of the present invention the parallel linkage is a Watts linkage.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
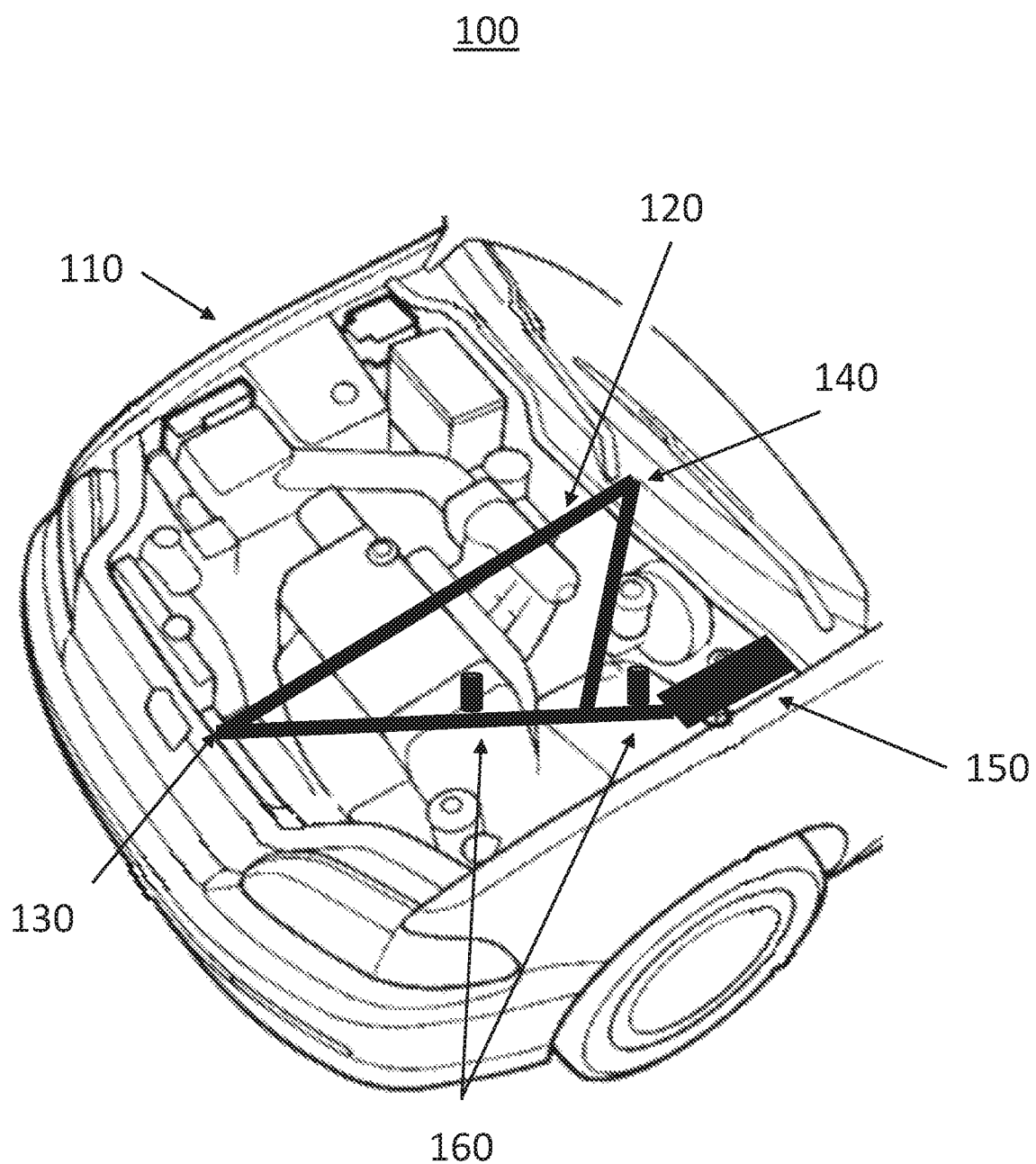
FIG. 1 shows an exemplary environment for application of a pivot pin for an assembly fixture in accordance with an embodiment.

Turning now to FIG. 1, an exemplary environment 100 for application of a pivot pin for an assembly fixture 120 according to an exemplary embodiment of the present disclosure is shown. In this exemplary environment 100 the exemplary assembly fixture is used in an automotive assembly application, but the described device and application may be advantageously employed in other assembly applications. The assembly fixture 120 is configured to position a part to be affixed to a vehicle assembly 110. The exemplary part is held in an appropriate orientation by a part retention device 150, such as a vice. The assembly fixture 120 may include a first pin 130 for positioning in a first locating hole, such as in a radiator cross brace. In this exemplary embodiment, the first pin 130 is rigidly affixed to the assembly fixture 120. The assembly fixture 120 may further include a second pin 140 for positioning in a second locating hole, such as in a top of a vehicle engine firewall. In this exemplary embodiment, the second pin 140 may float freely over a predefined range in one linear direction according to the teachings of the present disclosure. The one linear degree of freedom of movement advantageously reduces binding due to side loading of the second pin 140 while still maintaining the correct positioning of the exemplary part.

In an assembly fixture with two rigid pins, binding due to side loading of the pins may restrict the assembly fixture from being positioned within the locating holes, may restrict the assembly fixture from being removed from the locating holes, or may cause damage to the vehicle during positioning of the assembly fixture in the locating holes. To address this problem, one of the locating pins, such as the second pin 140, provides a linear degree of freedom of movement, such that the second pin 140 may move slightly when being positioned in and out of the locating hole. This floating second pin 140 enables the assembly fixture 120 to accurately locate the part to be affixed to the vehicle assembly 110, such as fenders, hood hinges, and the hoods to be accurately positioned while avoiding damage to the vehicle assembly 110.

Figure 2:
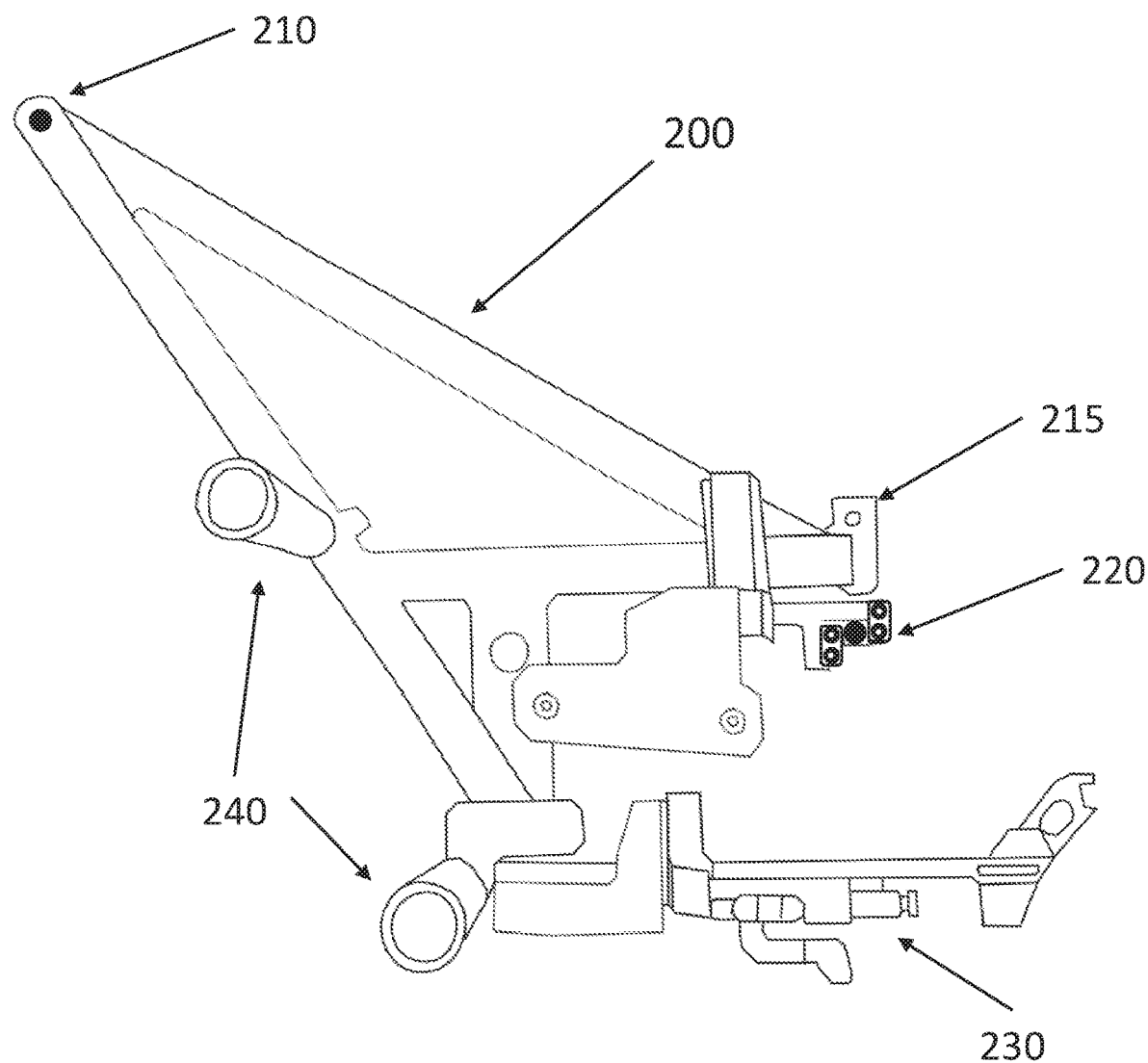
FIG. 2 shows an exemplary assembly fixture including a moveable pivot pin in accordance with an embodiment.

Turning now to FIG. 2, an exemplary assembly fixture 200 including a moveable pivot pin according to an exemplary embodiment of the present disclosure is shown. The exemplary assembly fixture 200 is shown from a top down view and may include a location of a first positioning pin 210, a location of a second positioning pin 220 within a positioning pin locator according to the present disclosure, a part restraint 230 and operator handles 240.

The first positioning pin 210 may be a positioning pin rigidly affixed to the assembly fixture 200, such as a metal pin having a first diameter, such as 1 cm. A corresponding locating hole having a second diameter, such as 1.02 cm may be located at a position on the vehicle assembly in order to receive the first positioning pin 210. The larger diameter of the locating hole allows the first positioning pin 210 to be inserted into the locating hole. The first positioning pin 210 may further include a conical or rounded tip to facilitate insertion of the first positioning pin 210 into the locating hole.

The second positioning pin 220 in this exemplary embodiment, may be part of a pivot pin assembly allowing one degree of freedom of lateral movement of the second positioning pin 220. In one exemplary embodiment, the assembly, including the second positioning pin 220, is affixed to the assembly fixture 200 at a location distal from the first positioning pin 210. This lateral movement afforded the second positioning pin 220 enables the assembly fixtures to accurately position the part on the assembly while avoiding binding of the assembly fixture 200 to the vehicle due to lateral pressure of the locating holes on the first positioning pin 210 and second positioning pin 220.

The exemplary assembly fixture 200 may further include a support foot 215 for providing vertical support for the assembly fixture 200 as well as providing a limitation of vertical movement of the assembly fixture 200. The support foot 215 may be positioned such that when the first positioning pin 210 and the second positioning pin 220 are inserted into their respective locating holes and pressure along an axis parallel to the positioning pins, that the support 215 foot limits movement along the axis parallel to the positioning pins.

The part restraint 230 is configured to hold a part in a desired orientation with respect to the assembly fixture 200 such that the part is positioned in a desired location and orientation with respect to the vehicle assembly when the first positioning pin 210 is inserted into the first location hole and the second positioning pin 220 is inserted into the second positioning hole. The part restraint 230 may employ a vice or clamp to apply a clamping pressure to hold the part. Alternatively, the part restraint 230 may include one or more magnets to provide a magnetic force on the part in order to hold the part in position. Once the part is fastened to the vehicle, such as by tightening one or more bolts through the part into the vehicle, the pressure on the part by the part restraint 230 is released such that the assembly fixture 200 may be removed from the vehicle.

The exemplary assembly fixture 200 may further include handles 240 for use by an operator for positioning the assembly fixture 200 on the vehicle. The handles 240 may be rigidly affixed to the assembly fixture 200. In one example, the handles 240 are positioned equal distance from a center of gravity of the assembly fixture 200 such that the assembly fixture 200 is balanced when held by the handles 240.

Figure 3:
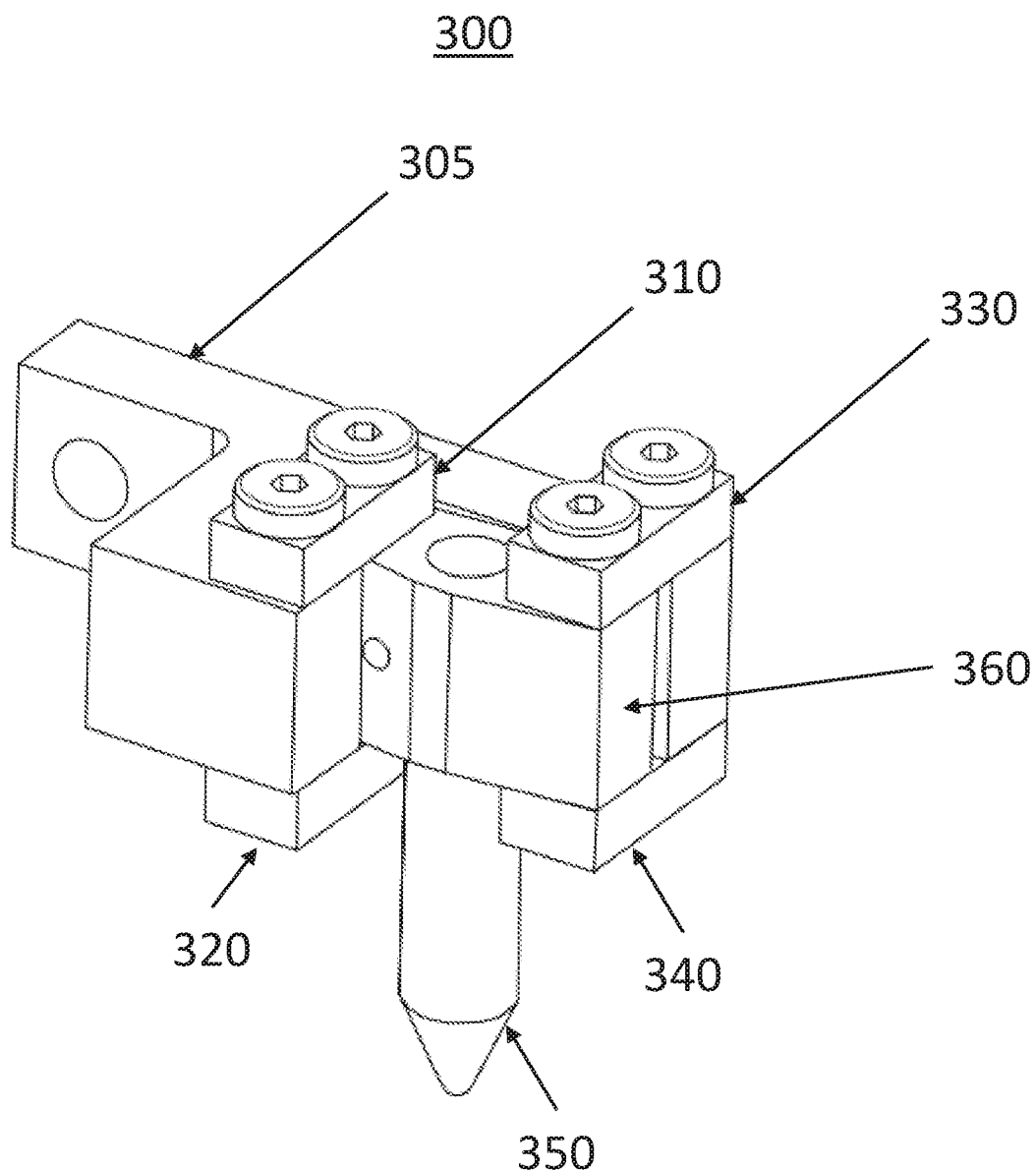
FIG. 3 shows an exemplary pivot pin assembly for an assembly fixture in accordance with an embodiment.

Turning now to FIG. 3, an exemplary pivot pin assembly 300 for an assembly fixture according to an exemplary embodiment of the present disclosure is shown. The exemplary pivot pin assembly 300 may include an upper inner link 310, an inner lower ling 320, an outer upper link 330, an outer lower link 340, a pin holder 360, a positioning pin 350 and a frame 305. The exemplary pivot pin assembly 300 is configured such that the frame 305 may be physically attached to an assembly fixture.

The exemplary pivot pin assembly is configured such that the positioning pin 350 realizes a limited range of motion in a single degree of freedom. The limited range of motion is afforded by a Watts linkage formed by the frame 305, upper inner link 310, inner lower link 320, outer upper link 330, outer lower link 340 and pin holder 360. For example, the upper inner link 310, inner lower link 320, outer upper link 330, and outer lower link 340 are attached to the frame 305 and the pin holder 360 such that they are not bound from rotation by their respective fasteners. For example, the upper inner link 310 and the inner lower link 320 may rotate with respect to the frame 305 such that the pin holder is afforded a linear motion in a direction substantially orthogonal to the plane of the links. Likewise, the outer upper link 330 and the outer lower link 340 are also attached to the frame and pin holder 360 such that they are not bound from rotation by their respective fasteners. The resulting single degree of freedom of movement of the pin 350 within the pin holder 360 compensates for some limited variation in the direction of the single degree of freedom of a locating hole on the vehicle.

Figure 4:
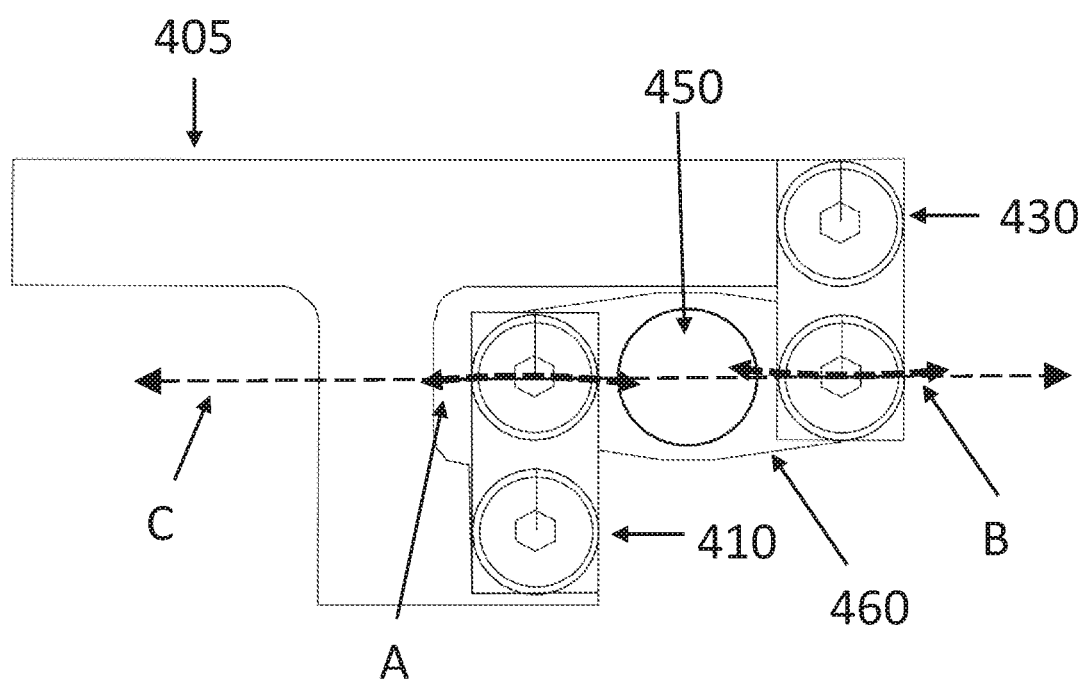
FIG. 4 shows a top view of an exemplary pivot pin assembly 400 for an assembly fixture in accordance with an embodiment.

Turning now to FIG. 4, a top view of an exemplary pivot pin assembly 400 for an assembly fixture according to an exemplary embodiment of the present disclosure is shown. The exemplary pivot pin assembly 400 includes a frame 405, an upper inner link 410, an upper outer link 430, a positioning pin 450, and a pin holder 460.

In this exemplary embodiment, the upper inner link 410 is rotationally affixed to the frame 405 at one end of the upper inner link 410 as an inner frame pivot point such that the opposite end of the upper inner link 410 has a first rotational movement (A) around the inner frame pivot point. Likewise, the upper outer link 430 is rotationally affixed to the frame 405 at one end of the upper outer link 430 as an outer frame pivot point such that the opposite end of the upper outer link 430 has a second rotational movement (B) around the outer frame pivot point. The pin holder 460 is rotationally affixed to the upper inner link 410 and the upper outer link 430. As a result of the first rotational movement (A) and the second rotational movement (B) on the rigid pin holder 460, the positioning pin 450 may realize a lateral linear motion (C) according to the Watts linkage principles. In one exemplary embodiment, any of the pivot points may be spring loaded such that the positioning pin 450 returns to an initial position on the lateral linear motion (C) when no external forces are acting upon the positioning pin 450.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An assembly fixture for positioning a component comprising:
 a rigid member including a triangular framework;
 a fixed positioning pin affixed to a first point on the rigid member for insertion in a first locating hole in an assembly and wherein the fixed positioning pin is affixed to a first vertex of the triangular framework;
 a component restraint affixed to a second point on the rigid member for applying a force to the component for retaining the component in a fixed position and orientation with respect to the assembly fixture and wherein the component restraint is affixed to a second vertex of the triangular framework; and
 a pivot positioning pin coupled to a third point on the rigid member by a flexible mounting assembly, the flexible mounting assembly facilitating a linear movement of the pivot positioning pin along a linear path and wherein the pivot positioning pin is coupled to a third vertex of the triangular framework.

2. The assembly fixture of claim 1 wherein the pivot positioning pin is coupled to the rigid member by a Watts linkage.

3. The assembly fixture of claim 1 wherein the pivot positioning pin is coupled to the rigid member by a parallel linkage.

4. The assembly fixture of claim 1 wherein the flexible mounting assembly includes a frame, a pin holder, a first parallel link coupled between the frame and the pin holder, and a second parallel link coupled between the frame and the pin holder.

5. The assembly fixture of claim 1 wherein the assembly is a vehicle and the component is a vehicle part.

6. The assembly fixture of claim 1 wherein the assembly is a vehicle and the component is an automotive body component.

7. The assembly fixture of claim 1 further including a first handle affixed to the rigid member and a second handle affixed to the rigid member.

8. The assembly fixture of claim 1 wherein the component restraint includes a clamp configured to apply a clamping pressure on the component to secure the component to the assembly fixture.

9. The assembly fixture of claim 1 wherein the component restraint includes a magnet for applying a magnetic force to the component to secure the component to the assembly fixture.

10. The assembly fixture of claim 1 wherein the flexible mounting assembly is configured to constrain the linear movement between a first point along a linear axis and a second point along the linear axis.

11. A component positioning device for positioning an automotive component on an automotive assembly comprising:

a triangular rigid framework;

a component clamp for applying a clamping pressure on the automotive component such that the automotive component is retained in a fixed position and orientation with respect to the triangular rigid framework;

a rigid positioning pin immovably affixed to a second vertex of the triangular rigid framework; and a moveable positioning pin coupled to a third vertex of the triangular rigid framework by a parallel linkage to enable a linear range of motion of the moveable positioning pin.

12. The component positioning device for positioning the automotive component on an automotive assembly of claim 11 wherein the component clamp includes a magnet for applying a magnetic force to the component to secure the component to the component positioning device.

13. The component positioning device for positioning the automotive component on an automotive assembly of claim 11 wherein the parallel linkage is a Watts linkage.

* * * * *